E. YODER.
VEHICLE TOWING DEVICE.
APPLICATION FILED NOV. 2, 1918.

1,342,079.

Patented June 1, 1920.
2 SHEETS—SHEET 1.

Inventor
EDWARD YODER,
By G. Howlett Davis
Attorney

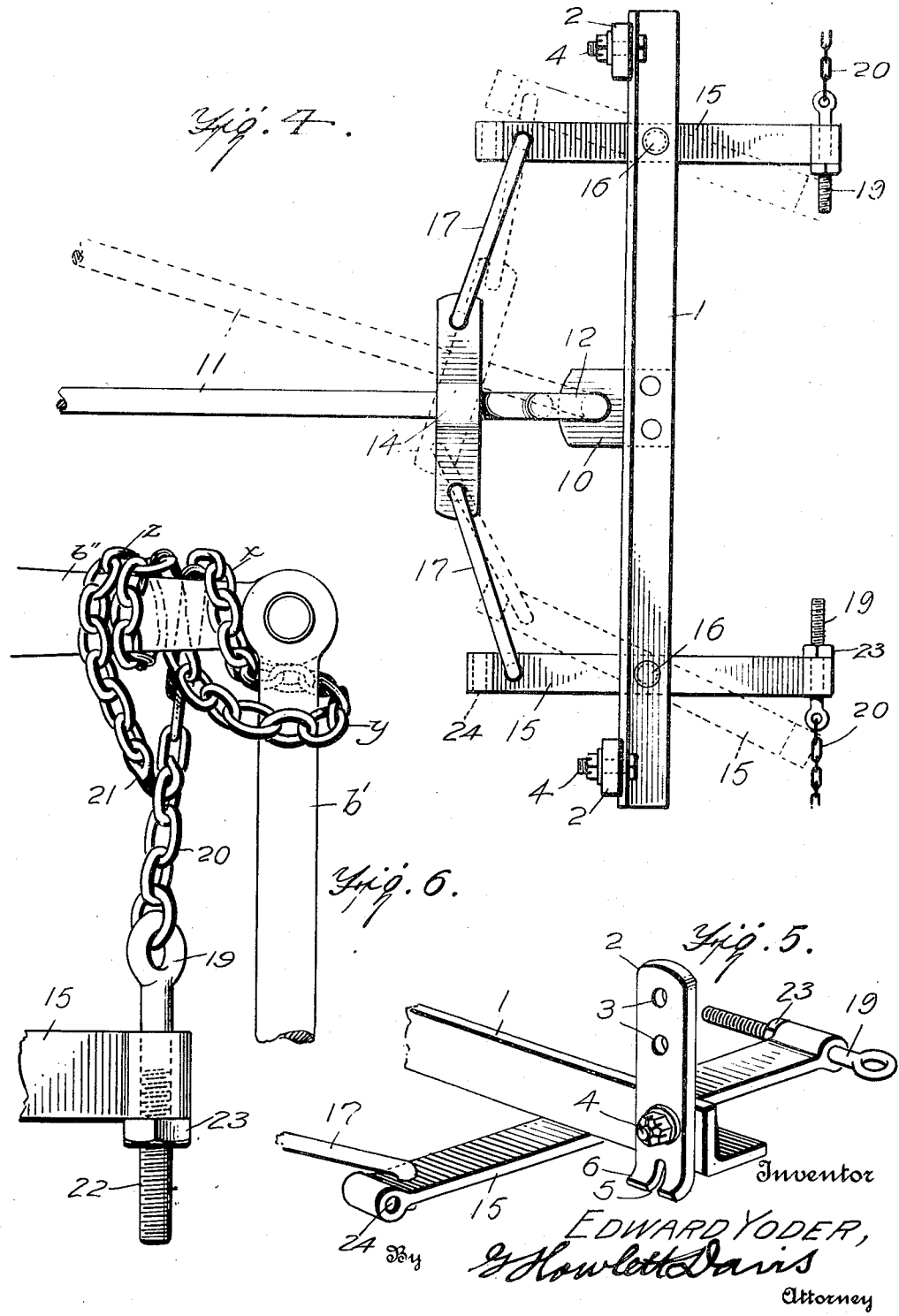

UNITED STATES PATENT OFFICE.

EDWARD YODER, OF TULSA, OKLAHOMA.

VEHICLE-TOWING DEVICE.

1,342,079. Specification of Letters Patent. Patented June 1, 1920.

Application filed November 2, 1918. Serial No. 260,771.

*To all whom it may concern:*

Be it known that I, EDWARD YODER, a citizen of the United States, residing at Tulsa, in the county of Tulsa and State of Oklahoma, have invented certain new and useful Improvements in Vehicle-Towing Devices, of which the following is a specification.

This invention relates to a towing and steering connection by means of which one vehicle may simultaneously pull and guide another, and it has special utility when used for hauling dead or disabled motor vehicles.

The principal object of the invention is to provide a device of this character which is light, cheap, and efficient, and which is of such a nature that it may be conveniently kept on hand by garage owners and quickly and readily attached to any car, when required.

In order that the invention may be clearly described, reference is had to the accompanying drawings forming part of this specification, and in which, Figure 1 is a plan view showing my invention as it appears when in use;

Fig. 4 is a fragmentary plan view of the principal parts of my device; other parts being omitted for the sake of clearness; and Figs. 5 and 6 are enlarged perspective views showing details of construction hereinafter described.

Figure 1:
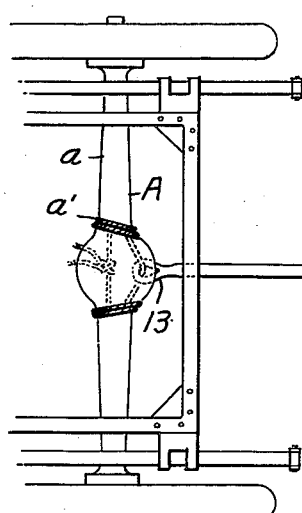
Figure 1:
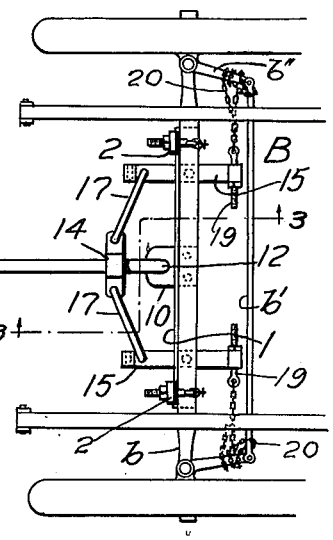
Figure 2:
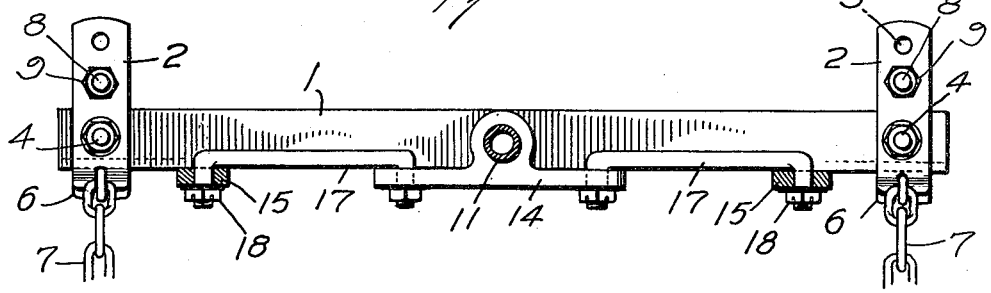
Fig. 2 is a sectional elevation thereof on an enlarged scale the section being taken on the line 2—2 of Fig. 1.

Referring to the drawings in detail and more particularly to Fig. 1, A designates a towing machine and B the machine or vehicle being towed. The vehicle B has the usual front axle $b$, steering rod $b'$, and knuckle levers $b''$.

Figure 3:
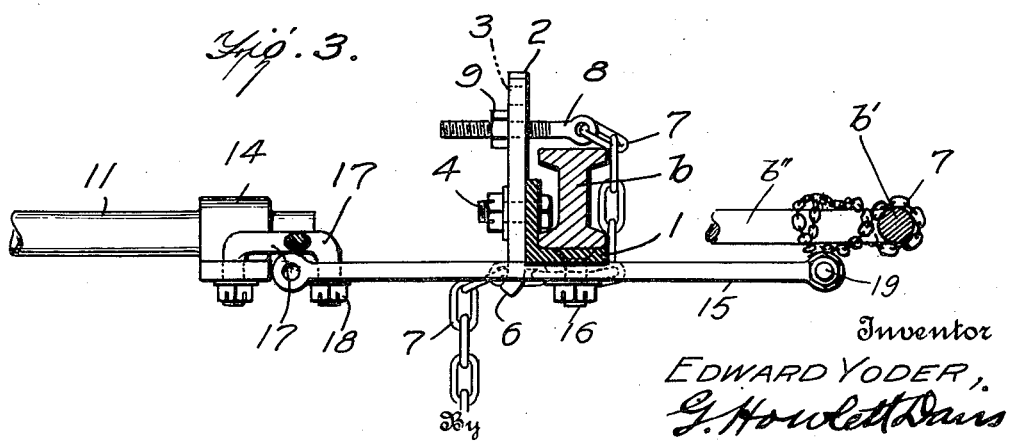
Fig. 3 is a transverse vertical section substantially on the line 3—3 of Fig. 1.

My improved towing and steering device comprises an elongated member 1 shown as an angle bar which is adapted to be secured to the front axle of the machine to be towed. The bar preferably fits under the axle $b$, as shown in Fig. 3 and is secured thereto by means of chains in the manner now to be described. To each end of the bar 1 is secured a vertically extending clip 2, each clip having at its upper end one or more bolt holes 3 and being bifurcated at its lower end to form an open slot 5. The extreme ends of the bifurcated portion are preferably bent outwardly to form claws 6, as shown in Fig. 5. The clips are secured to the front face of the bar 1 by means of bolts 4. An eye-bolt 8 is fitted through one of the holes in each clip and is secured in adjusted position by means of a nut 9. The chain 7 preferably formed of straight links is secured at one end to the eye-bolt and its free end is adapted to be brought around the axle $b$ and the bar 1, as illustrated in Fig. 3 and engaged in the slot 5. It will be obvious that the shape of the claws 6 will firmly hold the chain in position, and by means of the nut 9, the length of the chain can be regulated in accordance with the size of the axle of the particular vehicle being towed.

A bracket 10 is also secured to the bar 1 at its middle and pivoted to this bracket by means of an eye 12 is a tongue or pole 11, which forms a connection between the two vehicles. This tongue is preferably formed at its forward end with a loop or eye 13 through which a rope or cable $a'$ can be passed so that the tongue can be quickly lashed to the rear axle $a$ of the towing machine.

To the pole 11 near its rear end is secured a bracket 14 and to the bar 1 adjacent each end is pivotally secured by means of a bolt 16, a steering arm 15. These steering arms extend horizontally and their front ends are pivotally connected with the bracket 14 by means of links 17. These links preferably have down-turned ends on which fit nuts 18.

The rear ends of the arms 15 are provided with means by which they may be readily attached to the steering rod $b'$ and knuckle levers $b''$ of the towed machine. The specific means which I prefer to employ is illustrated in Fig. 6 and comprises a chain 20 secured at one end to an eye-bolt 19 set horizontally through an opening formed in the steering arm, and having a screw threaded shank 22. The chain 20 has a hook 21 at its free end. A convenient method of forming a hitch with this chain around the steering rod and knuckle lever is illustrated in Fig. 6. The chain is first brought over the knuckle lever, as indicated at $x$. It is then carried under and over the steering rod, as indicated at $y$, and thence under and over the knuckle lever again, around which it is preferably wrapped several times, as shown at $z$, the hook 21 being finally engaged in a link of the chain. In this way a firm hold on the steering rod and knuckle lever is obtained and a non-slipping connection secured.

It will be understood that after the bar 1 has been attached to the axle b, as shown in Fig. 3, the rear ends of the steering arms 15 are lashed to the steering rod and knuckle lever by means of the chains 20, as just described. Any slack in the chains is taken up by screwing the nuts 23 onto the threaded shanks of eye bolts 19, as will be obvious, until there is no lost motion. Any angular movement of the tongue or the pull, as indicated in Fig. 4, due to the vehicles passing around a curve, then results in turning the steering arms 15 on their pivots and thus shifting the steering rod b' so that the trailing vehicle B is properly guided.

The forward ends of the arms 15 are also provided with openings 24, to receive the eyebolts in cases where the steering rod is located in front of the axle.

It will thus be seen that I have provided a very simple, cheap and efficient towing device which can be readily attached to and detached from any existing type of vehicle and it is thought that many advantages of my invention will be readily appreciated without further discussion.

What I claim is:—

1. A towing device for vehicles comprising a bar adapted to be attached to the front axle of a vehicle, a pair of steering arms pivotally mounted on said bar, and means for connecting said arms with the vehicle steering gear.

2. A towing device for vehicles comprising a bar adapted to be attached to the front axle of a vehicle, a pair of steering arms pivotally mounted on said bar, means for connecting said arms with the vehicle steering gear, and a pole or rod pivotally secured to said bar and connected with said arms.

3. A steering device for vehicles comprising a pole and a pair of steering arms connected therewith, and means for attaching each of said steering arms to the steering rod and knuckle of the vehicle, such means comprising a piece of chain adapted to be wrapped around said steering rod and knuckle.

4. A steering device for vehicles comprising a pole and a pair of steering arms connected therewith, and means for attaching each of said steering arms to the steering rod and knuckle of the vehicle, such means comprising a piece of chain adapted to be wrapped around said steering rod and knuckle, said chain being secured to the arm at one end, and having a hook at the other.

5. A steering device for vehicles comprising a pole and a pair of steering arms connected therewith, and means for attaching each of said steering arms to the steering rod and knuckle of the vehicle, such means comprising a piece of chain adapted to be wrapped around said steering rod and knuckle, said chain having a hook at one end, and means for securing the other end of said chain to the steering rod, said means including a threaded eyebolt extending parallel with said steering rod.

6. A steering device for vehicles comprising a pole and a pair of steering arms connected therewith, means for attaching each of said steering arms to a kunckle lever of the vehicle, such means comprising a piece of chain adapted to be wrapped around such knuckle lever, and means carried by said arms for taking up the slack in said chains.

In testimony whereof I affix my signature in presence of two witnesses.

EDWARD YODER.

Witnesses:
J. R. KLINE,
F. A. McVAY.